Patented Mar. 26, 1935

1,995,576

UNITED STATES PATENT OFFICE 1,995,576

METHOD OF MANUFACTURING BRICKS

Henrik Nielsen, Oslo, Norway

No Drawing. Application October 24, 1930, Serial No. 491,088. In Norway October 24, 1929

3 Claims. (Cl. 25—156)

The present invention relates to a method of manufacturing bricks, which possesses marked advantages over previous methods. According to my process the bricks are produced at much lower cost and in far shorter time than hitherto and entirely independently of the season of the year.

Further the bricks produced are of far better quality than the product obtained by the hitherto usual methods of manufacture.

The new method may be described as dry-press process applied on the manufacture of bricks. According to my invention the dug raw clay is first subjected to drying until its content of moisture is reduced to less than 10 per cent. Then the dried clay is granulated to an appropriate size of grain, preferably of about 2.5 mm. in diameter.

Simultaneously formed fines may eventually be removed by sifting. The granulated mass containing between 5 and 10 percent of moisture (exclusive of the water existing as hydrate water in the clay which is not effected by the drying) is now moulded into blocks of brick shape under high pressure, preferably under a pressure of about 300 kg. per cm.$^2$, whereupon the moulded blocks are subjected to burning, preferably in a tunnel furnace.

Special tests have proved, that it is very important that the water content of the granulated clay is of the range mentioned above. With water content below 5 or above 10 per cent, the brick is by far not of the same quality, as when the moisture is kept within the said narrow limits. Further it is of vital importance that the dried clay is granulated and not ground.

The method described makes it possible to produce finished burnt bricks from raw clay in 24 hours, while the manufacture of bricks as hitherto carried out requires 10 to 15 days and nights for the burning operation alone. With dried clay which is finely ground and moistened about the same time of burning is required and the bricks so obtained are much heavier than according to my method.

I claim:

1. Method of manufacturing bricks, comprising drying clay until the content of moisture is between 5 and 10 per cent, granulating the dried clay, moulding the granulated mass under pressure into blocks and burning the moulded blocks.

2. Method of manufacturing bricks, comprising drying clay until the content of moisture is between 5 and 10 per cent, granulating the dried clay into grains of about 2.5 mm. in diameter, moulding the granulated mass under pressure into blocks and burning the blocks.

3. Method of manufacturing bricks, comprising drying clay until its content of moisture is between 5 and 10 per cent granulating the drier clay into grains of about 2.5 mm. in diameter, moulding the granulous mass into blocks under a pressure of about 300 kg. per cm.$^2$ and burning the blocks.

HENRIK NIELSEN.